UNITED STATES PATENT OFFICE.

ERNEST G. CHORMANN, OF PHILADELPHIA, PA., ASSIGNOR TO THE CHORMANN-MITCHELL MANUFACTURING COMPANY, OF NEW JERSEY.

COMPOSITION FOR DECORATIVE PURPOSES.

SPECIFICATION forming part of Letters Patent No. 346,841, dated August 3, 1886.

Application filed December 26, 1885. Serial No. 186,730. (Specimens.)

*To all whom it may concern:*

Be it known that I, ERNEST G. CHORMANN, a citizen of the United States, residing in Philadelphia, Pennsylvania, have invented certain Improvements in Compositions for Decorative Purposes, of which the following is a specification.

My invention consists of an improved composition which may be used for metallizing the products of nature and for modeling into artistic and decorative forms and shapes, as fully described hereinafter.

I first melt in an earthen crucible the following ingredients: clean river sand, (silex,) from ten to twenty-five parts, according to the product to be obtained; alkaline salt, (preferably carbonate of potassium,) from five to twenty parts; carbon, (preferably in the form of charcoal,) about one part. When this composition has melted, it forms a gelatinous mass which I free from foreign matter by washing with cold water. Then by adding about five parts of boiling water it becomes transparent soluble glass. To this compound I then add clay, kaolin, or other alumina, from five to fifteen parts; plumbago, from three to five parts; a flux, (preferably minium or lead,) from three to ten parts; and there is also added a metallic chloride in the proportion of from five to twenty parts. This chloride may be chloride of copper, silver, tin, or other metal, according to the desired color of the material to be produced, which I term "metalloid." As an example composition, I may cite the following: silex, fifteen parts; carbonate of potash, ten parts; charcoal, one part; pipe-clay, ten parts; plumbago, five parts; minium, five parts; metallic chloride, fifteen parts.

Instead of using a metallic chloride already produced I may introduce a finely-divided metal and about two parts of chloride of calcium, whereby the chloride given off goes to the potash and forms chloride of potash with substantially the same result as though a metallic chloride had been introduced in the first instance. By the addition to the material formed by melting the first three ingredients, of the alumina, plumbago, minium, and metallic chloride a pasty mass is formed which can be molded, modeled, or pressed into shape. On being left exposed to the air it becomes extremely hard, and is insoluble and non-corrosive. Without the addition of the chloride there would be an alkaline reaction, which would have a destructive effect. In some cases the plumbago may be omitted; but I prefer to use it where it is desired to keep the composition plastic and soft for a little longer time, to permit its more ready manipulation in coating or modeling. The composition thus formed may be used, as I have said, either for coating various substances, and thereby metallizing them, or as a material to be modeled into any desired shape for decorative or artistic purposes.

For coating purposes I may make use of the products of nature—such as the leaves, spines, barks, cones, &c., of various trees and plants—and these substances may be coated with the above-described composition by dipping or by a brush, so as to, in effect, metallize them, the surfaces becoming extremely hard and insoluble.

In coating substances I prefer, first, to use creosote or other coal-tar distillate to impregnate the substance for preservative purposes, and partly also because it has a chemical affinity for the coating composition.

Where this composition is to be molded or modeled into shape, I prefer to use a thickener—such as finely-divided metal, slag, cinders, chaff, sawdust, &c. In this case no calcium should be used in forming the original composition.

I claim as my invention—

1. The herein-described composition for decorative purposes, said composition consisting of a mixture of silex, an alkaline salt, carbon, clay, a metallic chloride, and a flux, all substantially as set forth.

2. The herein-described composition for decorative purposes, said composition consisting of a mixture of silex, an alkaline salt, carbon, clay, metallic chloride, flux, and plumbago, substantially as set forth.

In testimony whereof I have signed my name to this specification in the presence of two subscribing witnesses.

E. G. CHORMANN.

Witnesses:
JOSEPH H. KLEIN,
HARRY SMITH.